(12) United States Patent
Ksontini et al.

(10) Patent No.: US 7,822,205 B2
(45) Date of Patent: Oct. 26, 2010

(54) MULTIPLE MATCHING CONTROL METHOD

(75) Inventors: Rached Ksontini, Lausanne (CH); Marco Sasselli, Chardonne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 1180 days.

(21) Appl. No.: 10/528,787

(22) PCT Filed: Sep. 19, 2003

(86) PCT No.: PCT/IB03/04190

§ 371 (c)(1), (2), (4) Date: Mar. 23, 2005

(87) PCT Pub. No.: WO2004/030361

PCT Pub. Date: Apr. 8, 2004

(65) Prior Publication Data

US 2006/0153386 A1 Jul. 13, 2006

(30) Foreign Application Priority Data

Sep. 24, 2002 (CH) .................................. 1605/02

(51) Int. Cl.
- *H04L 9/00* (2006.01)
- *H04L 9/08* (2006.01)
- *G06F 15/16* (2006.01)
- *H04L 29/06* (2006.01)
- *H04L 9/32* (2006.01)

(52) U.S. Cl. .................. 380/277; 380/286; 709/227; 709/231; 713/169

(58) Field of Classification Search ......... 380/277–279, 380/286; 709/227–232
See application file for complete search history.

(56) References Cited

U.S. PATENT DOCUMENTS 5,412,718 A * 5/1995 Narasimhalu et al. ......... 705/51

(Continued)

FOREIGN PATENT DOCUMENTS

WO WO 99/43120 A1 8/1999

(Continued)

OTHER PUBLICATIONS

International Search Report and International Preliminary Examination Report.

(Continued)

*Primary Examiner*—Kimyen Vu
*Assistant Examiner*—Darren Schwartz
(74) *Attorney, Agent, or Firm*—Harness, Dickey & Pierce, PLC

(57) ABSTRACT

The aim of this invention is to pair a security module with one or more host apparatuses in an environment in which the host module has no connection with the management centre.

This aim is achieved thanks to a pairing control method between a first device such as a removable security module and a second device such as a host apparatus, this pairing consisting in securing data exchanges with the aid of a unique pairing key, this method consisting in:

- verifying the pairing between the two devices and using the unique pairing key if the pairing has been already carried out, if not,
- searching for a free location among the locations reserved for the pairing data in the first device and in this case,
- initiating a pairing procedure by transmitting a cryptogram contained in the second device and that contains an identifier belonging to this device, this cryptogram being encrypted by a secret key common to all the first devices,
- decrypting this cryptogram using the first device and extracting from this cryptogram the identifier of the second device,
- generating a pairing key based on this identifier,
- storing in the first device the pairing data with the second device.

9 Claims, 1 Drawing Sheet

U.S. PATENT DOCUMENTS

| | | | | |
|---|---|---|---|---|
| 6,026,165 | A * | 2/2000 | Marino et al. | 380/273 |
| 6,148,404 | A * | 11/2000 | Yatsukawa | 726/2 |
| 6,351,536 | B1 * | 2/2002 | Sasaki | 380/44 |
| 6,367,010 | B1 * | 4/2002 | Venkatram et al. | 713/171 |
| 6,463,537 | B1 * | 10/2002 | Tello | 713/182 |
| 6,975,729 | B1 * | 12/2005 | Perlman | 380/277 |
| 7,185,196 | B1 * | 2/2007 | Kuskin et al. | 713/162 |
| 2001/0005682 | A1 * | 6/2001 | Terao et al. | 455/550 |
| 2002/0041337 | A1 * | 4/2002 | Candelore | 348/591 |
| 2002/0124176 | A1 * | 9/2002 | Epstein | 713/186 |
| 2003/0026433 | A1 * | 2/2003 | Matt | 380/278 |

FOREIGN PATENT DOCUMENTS

| | | |
|---|---|---|
| WO | WO 00/04718 | 1/2000 |
| WO | WO 00/59222 A | 10/2000 |
| WO | WO 01/06785 A1 | 1/2001 |
| WO | WO 02/052515 | 7/2002 |

OTHER PUBLICATIONS

Office Action for corresponding European Application No. 03 798 331.9 dated Aug. 21, 2009.

* cited by examiner

MULTIPLE MATCHING CONTROL METHOD

FOREIGN PRIORITY STATEMENT

This application is the national phase under 35 U.S.C. §371 of PCT International Application No. PCT/IB2003/004190 which has an International filing date of Sep. 19, 2003, which designated the United States of America and which claims priority on Swiss Patent Application number 2002-1605/02 filed Sep. 24, 2002, the entire contents of which are hereby incorporated herein by reference.

BACKGROUND

1. Field

The present invention refers to the domain of pairing between a security module and a host module, with the particular aim of securing communications between the two modules.

2. Description

Pairing is a known mechanism that consists in dividing a unique secret between two devices thus rendering the communication between these two devices inaccessible to all other devices.

This pairing is described in application EP1078524 and allows the connection of a security module to a receiver thanks to the presence of a unique encryption key known only by these two elements.

In an environment that allows the connection of a security module to several host apparatuses such a pairing is not possible, as it is too restrictive.

The document WO02/052515 describes a solution that puts into practice the pairing control by means of a management centre. The security module can be paired to any apparatus as long as the management centre gives authorisation. This solution supposes the existence of a channel that allows the management centre to send one or more messages to the security module.

SUMMARY

Therefore, the aim of this invention is to pair a security module with one or more host apparatuses in an environment in which the call to a management centre is not possible at the time of the pairing, that is to say, there is no channel between the management centre and the security module.

This aim is achieved thanks to a pairing control method between a first device such as a removable security module and a second device such as a host apparatus, this pairing consisting in securing data exchanges with the aid of a unique pairing key, this method consisting in:
  verifying the pairing between the two devices and using the unique pairing key if the pairing has been already carried out, if not,
  searching for a free location among the locations reserved for the pairing data in the first device and in this case,
  initiating a pairing procedure by transmitting a cryptogram contained in the second device and that contains an identifier belonging to this device, this cryptogram being encrypted by a secret key common to all the first devices,
  decrypting this cryptogram using the first device and extracting from this cryptogram the identifier of the second device,
  generating a pairing key based on this identifier,
  storing in the first device the pairing data with the second device.

This method contains two important characteristics. The first is the possibility of storing several pairing data in the security module (first device). The maximum number will be voluntarily limited in order to prevent the same module pairing with an unlimited number of host apparatuses.

The second characteristic is the way in which the pairing key is created. Initially, one particular security module is not destined to pair with a particular host apparatus. This is why, according to a first variant, a unique identifier is encrypted in the host apparatus (second device) with a key that is contained in each security module. This identifier can be the serial number of the host apparatus, an encryption key or a number randomly generated during the personalization of each host apparatus or it can be a mixture of these elements.

According to an embodiment, the cryptogram contains a secret key that can be of the symmetrical or asymmetrical type. Once decrypted by the security module, the latter generates a random key that will be the pairing key and encrypts it with the secret key then sends it to the host apparatus. The unique serial number of the host apparatus will preferably be contained in the first messages exchanged between the two elements in order to obtain pairing verification.

In a second embodiment, the pairing key is already included in the cryptogram transmitted by the second device. In this case, the pairing key is a unique key, belonging to the host apparatus and does not depend in any way on the security module.

The invention also refers to a way in which the cryptogram is contained in the security module. The latter is that which will transmit the cryptogram to the host apparatus for the generation of the pairing key. It is to be considered that the common decryption key, in this case stored in the host apparatus, is stored in a security element, such as a secured memory.

If a new pairing is carried out, the pairing data will be registered and will occupy one of the locations envisaged for the different pairing that a security module is able to accept. The pairing data is for example the host apparatus serial number together with the pairing key.

Due to the fact that the number of locations is limited, it is probable that the security module will be connected to a new host apparatus while all the locations are in use. To determine the location to be replaced, there are several mechanisms, namely:
  an activity counter associated to each location. At each pairing negotiation between the security module and the host apparatus this counter is increased. In this way, the smallest counter determines the location least used. Said location is that which will be replaced by the new pairing. Pairing negotiation is generally understood to mean the powering on the host module and the request for information by the security module.
  a pairing chronology counter associated to each location. At each pairing negotiation, the corresponding counter takes the value of the greatest of all the counters plus one, except if this counter is already the greatest, in which case it is not modified. Thus, the counter having the lowest value indicates the location of the oldest pairing. This is the location that will be replaced by the new pairing.

In one embodiment, with any new pairing or any pairing changes (this happens when no free locations are available) a secret code (PIN code) is introduced. On the first insertion of the security module in the host apparatus the security module initiates a sequence in the host apparatus that, according to its display means, requests the user to introduce this secret code. When the user introduces the correct code, which is then transferred towards the security module, it is the only valid case for which the latter will accept this new pairing.

According to the chosen variants, it is possible that this secret code will be required for each new pairing without relation to the occupancy of the memory locations. In another variant, it is possible to force the secret code to intervene in the case of replacing a location that is already occupied.

Several variants are envisaged to determine the validity of this secret code. In a first simplified variant, the secret code is constant for a security module and is distributed with said module.

In a second variant, the user calls or connects to a management centre that transmits to the user the unique number of the security module and of the host apparatus. This centre calculates a secret code according to an algorithm taking into account the two variables that are the two unique numbers. This algorithm is also contained in the security module in order to verify the conformity of the secret code. The call to the management centre can be made prior to pairing so that the necessary code will be available when the module connects with the host apparatus.

According to a third variant, the algorithm used for the calculation of the code is based on the unique number of the security module and of an incremental index. This code is then combined with the unique number of the host apparatus in order to obtain the secret code that is then transmitted to the user to authorize its new pairing.

The code can be determined according to the formula: $CS=G(K, (FN(UA)))=G(K, F((FN-1(UA))))$, in which CS is the secret code, UA the unique number of the security module, N the incremental index, K the unique number of the host apparatus, F an encryption function and G a function which makes K intervene in the calculation of the CS.

In this way, the secret code inevitably changes for each pairing. Either the result of the function $FN-1(UA)$, or the value of the index N is stored in the module memory to be used as the starting point for the next pairing. In order for the centre to be able to calculate the correct secret code, it is necessary for the centre to be synchronised with the security module. For this, the user, during the request, can for example, transmit to the centre the value of the index N or the result of the function $FN-1(UA)$ previously transmitted by the security module. Of course, the user must also transmit the unique number of the security module and of the host apparatus to the management centre.

However, if the value of the index N in the security module is not accessible to the management centre, said centre can transmit a secret code that does not necessarily correspond to the last index of the security module. Due to this eventual difference between the index stored in the security module and the index stored in the management centre, a secret code correctly calculated in the management centre can be rejected by the security module.

In this case, it is possible to resynchronise the security module. If for example, the management centre has provided a secret code originating from the number of the user's host apparatus and from the cryptogram of incremental index 12, that is to say that which is in the management centre, and if the cryptogram stored in the security module is of index 8, then the module will calculate the secret codes corresponding to indexes 8, 9, 10, 11, 12 to notice that the cryptogram originating from the manually introduced code corresponds to a valid cryptogram of a higher index. This noticing indicates that the management centre has previously sent four secrets codes that the user of the security module has finally not used.

It is certain than the index difference between the current index (8 in our example) and the management centre index (12 in our example) will be limited to an acceptable number. It is not a question of searching through thousands possibilities in the hope of finding the correct secret code.

It is to be highlighted that this third variant includes the possibility of not allowing the intervention of the unique number of the host apparatus in the calculation of the secret code, by defining $CS=(FN(UA))$ which corresponds to the case in which the previously mentioned function G is defined using $G(x, y)=y$. This variant is interesting if one wishes to separate the secret code from the host apparatus number. In fact, if it is easy to find out the number of the security module, by definition an easily transportable module, it is more difficult to find out the unique number of the host apparatus, in particular when the secret code has to be obtained before connecting the two elements.

BRIEF DESCRIPTION OF THE DRAWINGS

The above and other features and advantages will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted

DETAILED DESCRIPTION OF EXAMPLE EMBODIMENTS

Figure 1:
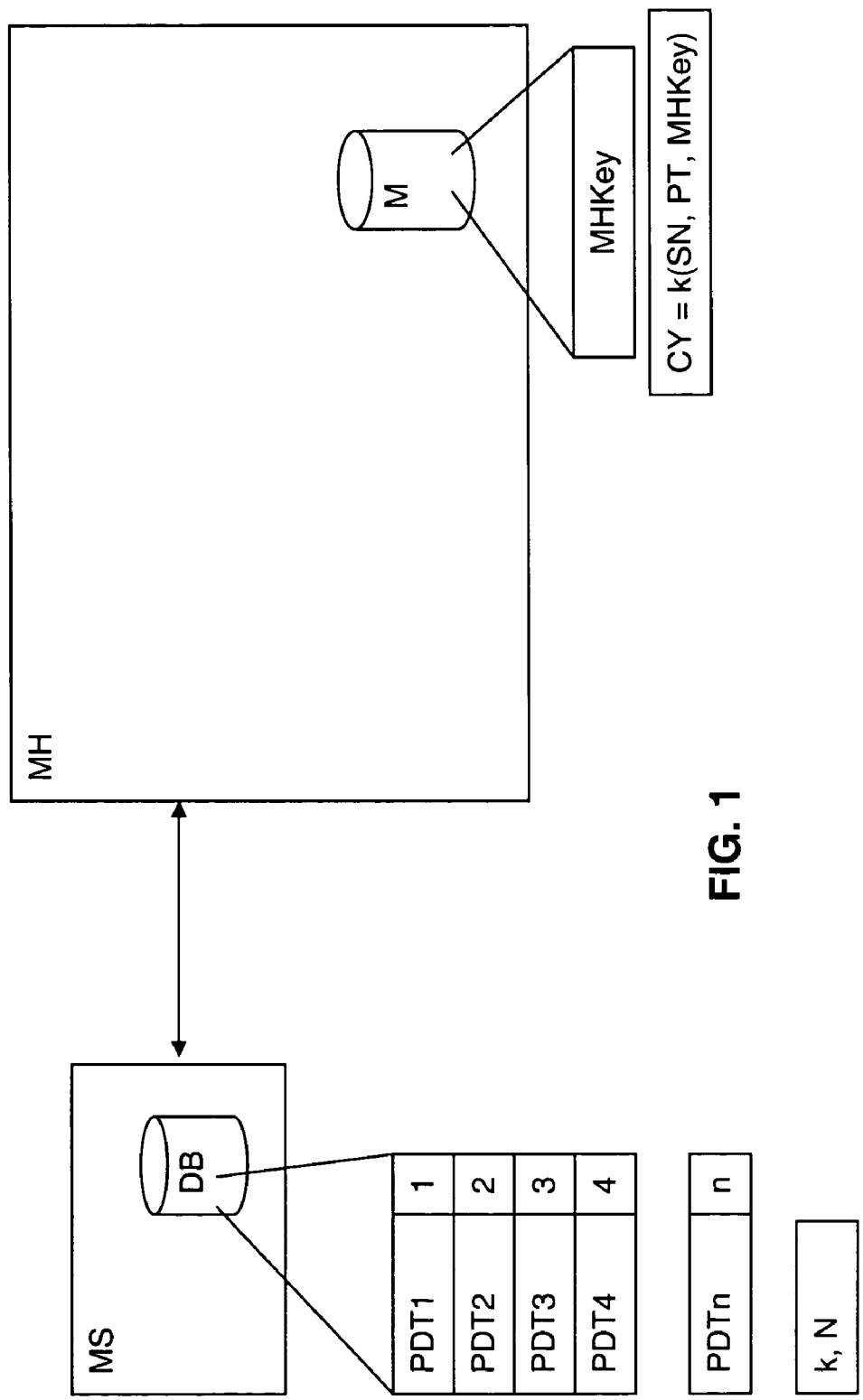
FIG. 1 illustrates a connection between a security module and host module, according to example embodiments.

The security module MS includes a secured database DB in which, amongst others, the pairing data is to be found. This reference data PDT1 to PDTn occupies the memory locations from 1 to n. Note that the number n of locations envisaged in the module MS can be equal to 1.

This base DB also contains the key k common to all the security modules MS and allows the decryption of the cryptogram CY as well as the index N of the number of pairings previously carried out.

Initially, the host module MH contains this index in a memory M that can either be of the secured type or freely accessible. However, it is preferable that this memory is protected and difficult to access in order to avoid one host apparatus being confused with another.

This cryptogram CY is encrypted by the key k and contains, in one embodiment, the serial number SN and a mark PT which value is known by the security module. This mark PT allows the security module ensuring the validity of the cryptogram. This mark PT is common to all the cryptograms. According to another variant, it can be unique to the host apparatus. The cryptogram CY can also contain the pairing key MHKey of the host apparatus that will later be used to secure the data transmission between the module MS and the host apparatus. For example, once this key is known by the two modules, a session key KS can be negotiated and used to encrypt the communication. Of course, in such a case, the key MHKey must also be stored in memory M of the host apparatus and this memory must therefore be secured.

In the database DB of the security module MS, the data PDT1 to PDTn includes an activity or chronology counter such as described above. It is to be remembered that these counters allow the determination of the location to be replaced in the case that all locations are in use. In the cases where activity counters are used, the three locations can be used as an example, such as the locations PDT1 to PDT3 respectively occupied by the pairings carried out by host modules MHA, MHB and MHC. At each pairing negotiation between the security module MS and the module MHC for example, the counter CPT3 will be increased.

In the embodiments in which a session key KS generated from the pairing key KA is used, it should be noted that this pairing can evolve dynamically, that is to say, that the session key KS is necessary changed after a certain usage period; on the basis of the elements transmitted during the pairing between these two entities (pairing key, host module key MHKey), a new session key is generated in this way. The number of session keys already generated can then be counted and this number can be considered as an activity counter.

When a new pairing request is required to the security module, it will determine the lowest activity counter and clear this location. Of course, the security module also contains all the necessary information to calculate and verify the secret codes.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is

1. A method of controlling pairing between a removable security module and a host apparatus connected to the removable security module, the pairing method securing data exchanged between the removable security module and the host apparatus by using a unique pairing key, the method comprising:
   verifying the pairing between the removable security module and the host apparatus and using the unique pairing key when the pairing between the removable security module and the host apparatus has been already carried out, wherein, when the pairing between the removable security module and the host apparatus has not been carried out, the method includes,
      searching for a free location among locations reserved for the unique pairing key in the removable security module and wherein, when a free location is absent, the method further includes performing at least one of
         reading an activity counter associated with each location of the removable security module, said activity counter being incremented each time a location is used for pairing, and finding a lowest value activity counter to determine the location to be used for a pairing procedure, and
         reading a chronology counter associated with each location of the removable security module, said chronology counter being incremented each time a location is used for pairing, and finding a lowest value chronology counter to determine the location to be used for a pairing procedure,
      initiating the pairing procedure by transmitting a cryptogram contained in the host apparatus, the cryptogram including an identifier identifying the host apparatus and the unique pairing key, and the cryptogram being encrypted by a secret key common to a plurality of removable security modules, the plurality of removable security modules including the removable security module,
      decrypting the cryptogram with the removable security module and extracting the identifier of the host apparatus and the unique pairing key from the cryptogram, and
      storing the unique pairing key in the removable security module, the unique pairing key used to pair with the host apparatus.

2. The method according to claim 1, wherein the unique pairing key is based on the identifier of the host apparatus on the data of the removable security module.

3. The method according to claim 1, wherein the cryptogram is stored in the removable security module and encrypted with a secret key common to a plurality of host apparatuses.

4. The method according to claim 1, wherein pairing is conditioned by the introduction of a secret code transmitted to the removable security module and verified by said removable security module.

5. The method according to claim 4, wherein the secret code belongs to and is unique to each removable security module.

6. The method according to claim 4, wherein the required secret code is different in each pairing.

7. The method according to claim 4 further comprising:
   transmitting a unique identifier of the removable security module and the identifier of the host apparatus to a management center,
   verifying the conformity of the pairing and calculating, by means of the management center, a corresponding secret code on the basis of the two identifiers,
   transmitting the secret code to a user,
   initiating the pairing and requesting the introduction of the secret code, by means of the removable security module,
   calculating by means of the removable security module the necessary secret code on the basis of the identifiers of the removable security module and the host apparatus,
   comparing the calculated code with a code introduced by the user,
   accepting the pairing if the two codes are identical.

8. The method according to claim 7 further comprising, determining the new secret code on the basis of the identifiers of the removable security module and the host apparatus and of an index that represents the number of pairings previously carried out, whereas the removable security module stores this index in its memory.

9. A method of controlling pairing between a removable security module and a host apparatus connected to the removable security module, the pairing method securing data exchanged between the removable security module and the host apparatus by using a unique pairing key, the method comprising:
   verifying the pairing between the removable security module and the host apparatus and using the unique pairing key when the pairing between the removable security module and the host apparatus has been already carried out, and when the pairing between the removable security module and the host apparatus has not been carried out:
      searching for a free location among locations reserved for the unique pairing key in the removable security module and wherein, when a free location is absent, the method further includes performing at least one of
         reading an activity counter associated with each location of the removable security module, said activity counter being incremented each time a location is used for pairing, and finding a lowest value activity counter to determine the location to be used for a pairing procedure, and
         reading a chronology counter associated with each location of the removable security module, said chronology counter being incremented each time a location is used for pairing, and finding a lowest value chronology counter to determine the location to be used for a pairing procedure, initiating the pairing procedure by transmitting a cryptogram contained in the host apparatus, the cryptogram including an identifier identifying the host apparatus and the unique pairing key, and the cryptogram being encrypted by a secret key common to a plurality of removable security modules, the plurality of removable security modules including the removable security module, decrypting the cryptogram with the removable security module and extracting the identifier of the host apparatus and the unique pairing key from the cryptogram, and storing the unique pairing key in the removable security module, the unique pairing key used to pair with the host apparatus.

* * * * *